United States Patent Office 3,314,941
Patented Apr. 18, 1967

3,314,941
NOVEL SUBSTITUTED PYRIDODIAZEPINS
Ruddy Littell, River Vale, N.J., and Duff Shederic Allen, Jr., Dobbs Ferry, N.Y., assignors to American Cyanamid Company, Stamford, Conn., a corporation of Maine
No Drawing. Filed June 23, 1964, Ser. No. 377,406
15 Claims. (Cl. 260—239.3)

This invention relates to novel substituted pyridodiazepines, the 4-oxides thereof, pyridodiazepin-2-ones, and the 4-oxides thereof and, more particularly, is concerned with new compounds which may be represented by the following general formulas:

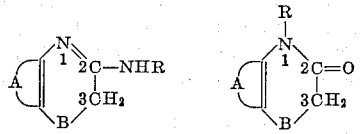

wherein R is hydrogen or lower alkyl, A represents a nitrogen atom and the three carbon atoms necessary to complete a pyridine ring and which is selected from the group consisting of

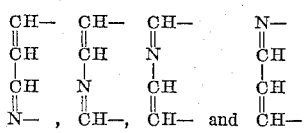

and B represents a carbon nitrogen linkage which completes the 7-membered diazepin ring and which is selected from the group consisting of

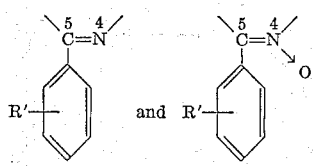

wherein R' is hydrogen, halogen, lower alkyl, lower alkoxy, nitro, amino or trifluoromethyl. Suitable lower alkyl and lower alkoxy groups contemplated by the present invention are those having from one to six carbon atoms. Halogen is exemplified by chlorine, bromine, and iodine.

More particularly, the formulas of the respective pyridodiazepines, the 4-oxides thereof, the pyridodiazepin-2-ones, and the 4-oxides thereof may be set forth as follows:

(VII)

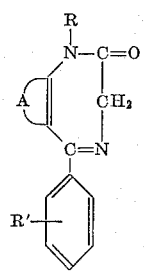

(XIV)

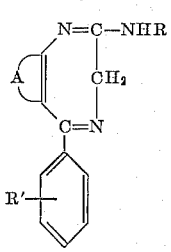

(XII)

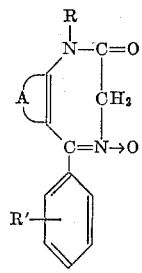

(XIII)

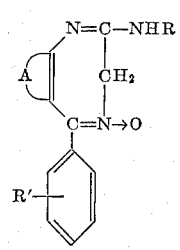

wherein A, R and R' are as hereinabove defined.

The novel compounds of the present invention are, in general, white to tan crystalline solids, the free bases of which are soluble in organic solvents such as lower alkanol, chloroform, dimethylformamide, dioxane, pyridine and the like; and the salts of which are soluble in polar solvents such as water and lower alkanols.

The novel compounds of the present invention are valuable anti-convulsant agents of low toxicity and may be administered orally or parenterally. When so administered, they have been found to exhibit anti-convulsive action in amounts ranging from about 25 to about 350 milligrams per kilogram of body weight. In addition, the novel compounds of the present invention are valuable muscle relaxants and have been found to exhibit such activity in amounts ranging from about 5 to about 1000 milligrams per kilogram of body weight.

The present invention also embraces the useful non-toxic pharmaceutically acceptable acid-addition and quaternary ammonium salts of these novel compounds. Thus, acid-addition salts, formed by admixture of the organic free base with an acid, suitably in a neutral solvent, are formed with such acids as sulfuric, phosphoric, hydrochloric, hydrobromic, sulfamic, citric, lactic, malic, succinic, tartaric, acetic, benzoic, gluconic, ascorbic, and related acids. Quaternary ammonium salts may be formed by reaction of the free bases with a variety of organic esters of sulfuric, hydrohalic, and aromatic sulfonic acids. The organic reagents employed for quaternary ammonium salt formation are preferably lower alkyl halides. However, other organic reagents are suitable for salt formation, and may be selected from among a diverse class of compounds including benzyl chloride, phenethyl chloride, naphthylmethyl chloride, dimethyl sulfate, methyl benzenesulfonate, ethyl toluenesulfonate, allyl chloride, methallyl bromide and crotyl bromide. Both acid-addition salt and quaternary ammonium salt formation takes place at the nitrogen atom of the pyridine ring. For purposes of this invention the free bases are equivalent to their non-toxic acid-addition and quaternary ammonium salts.

The novel substituted pyridodiazoepin-2-ones of the present invention, i.e. the compounds of Formula VII bove, may be prepared from o-aminopyridophenones as set forth in the following reaction scheme:

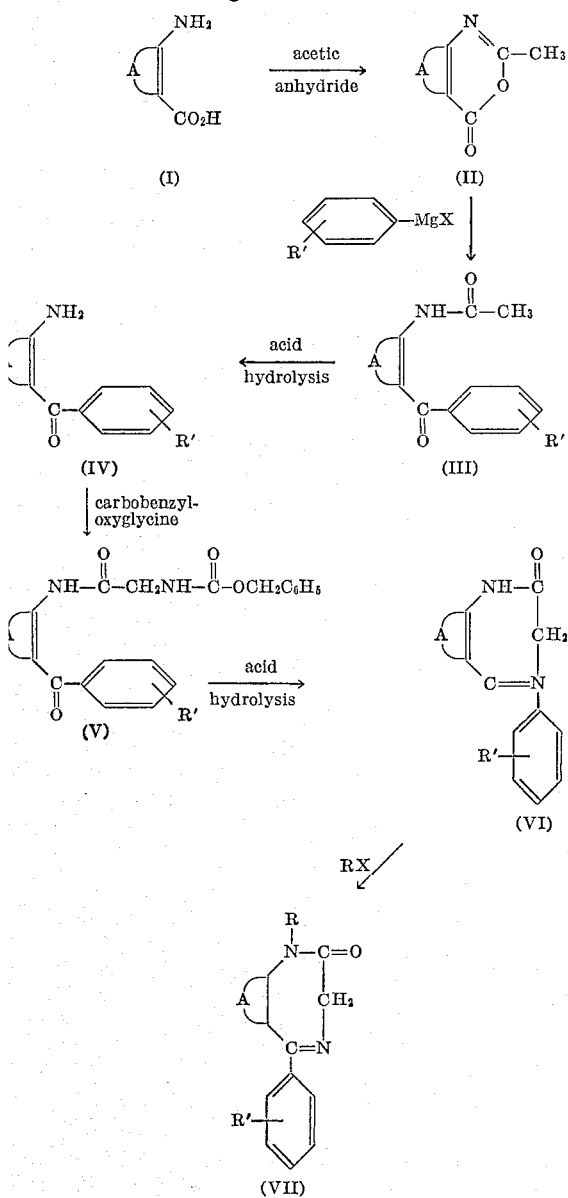

wherein X is halogen and A, R and R' are as hereinabove defined. In accordance with the present invention, o-aminopyridine carboxylic acid (I) is first converted to the corresponding 2-methylpyridoxazin-4-one by treatment with acetic anhydride in excess acetic anhydride as solvent at the reflux temperature for a period of of a few hours. This 2-methylpyridoxazin-4-one (II) is then subjected to treatment with an appropriately substituted phenylmagnesium halide whereby the corresponding o-acetamidopyridophenone (III) is obtained. The Grignard reagent condensation is conveniently carried out in an inert organic solvent such as diethyl ether at temperatures of from about 0° C. to about room temperature for a period of time of from about 2 to about 10 hours. The o-acetamidopyridophenone (III) is then subjected to acid hydrolysis whereby the corresponding o-aminopyridophenone (IV) is obtained. This acid hydrolysis is conveniently carried out with a mineral acid such as hydrochloric, sulfuric, phosphoric, etc. in a lower alkanol solvent at the reflux temperature of the solvent for a period of time of a few hours.

The o-aminopyridophenone (IV) is then converted to the corresponding o-(α-carbobenzoxamidoacetamido)pyridophenone (V) by treatment with carbobenzyloxyglycine in an inert organic solvent such as dichloromethane or tetrahydrofuran in the presence of a carbodiimide for a period of time of from about 3 to about 7 hours at about room temperature. The particular carbodiimide employed is not critical and suitable carbodiimides are, for example, N,N'-diisopropylcarbodiimide, N,N'-dicyclohexylcarbodiimide, etc. The o-(α-carbobenzoxamidoacetamido)pyridophenone (V) is then subjected to acid hydrolysis whereby the corresponding pyridodiazepin-2-one (VI) is obtained. This acid hydrolysis is conveniently carried out in glacial acetic acid saturated with a mineral acid such as hydrobromic acid at about room temperature for a period of time of from about 15 minutes to about 2 hours. The pyridodiazepin-2-one (VI) may be readily N-alkylated with a lower alkyl halide whereby the 1-alkyl derivative (VII) is obtained.

The novel substituted pyridodiazepines, the 4-oxides thereof, and the pyridodiazepin-2-one-4-oxides of the present invention, i.e. the compounds of Formulas XII, XIII and XIV above, may be prepared from o-aminopyridophenones as set forth in the following reaction scheme:

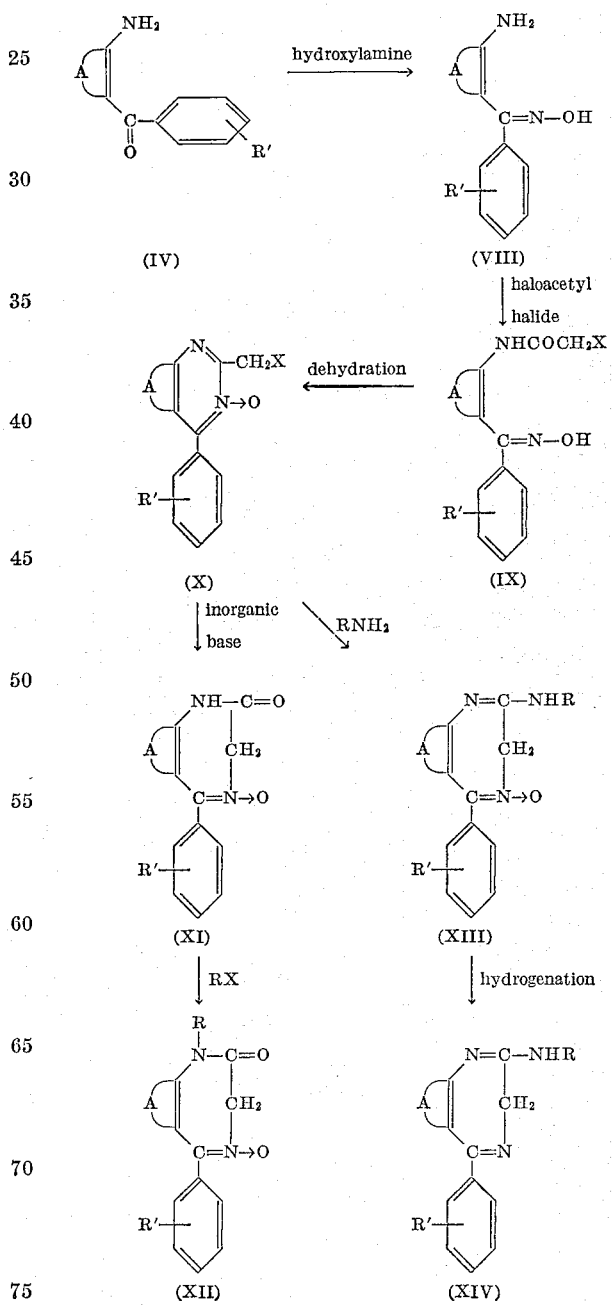

wherein X is halogen and A, R and R' are as hereinabove defined. In accordance with the present invention, o-aminopyridophenone (IV) is treated with hydroxylamine to give the corresponding oxime (VIII) which is then halo-acetylated with haloacetyl halide whereby the corresponding haloacetamidopyridophenone (IX) is obtained. This haloacetamidopyridophenone (IX) on treatment with mineral acid dehydrates to form pyridopyrimidine (X) which upon treatment with an inorganic base, rearranges to give the desired pyridodiazepin-2-one-4-oxide (XI). The pyridodiazepin-2-one-4-oxide (XI) may be readily N-alkylated at the 1-position with a lower alkyl halide whereby the 1-alkyl derivative (XII) is obtained. Treatment of the pyridopyrimidine (X) with a lower alkylamine yields the pyridodiazepine-4-oxide (XII) which upon hydrogenation with Raney nickel as catalyst affords the pyridodiazepine (XIV).

The novel compounds of the present invention may be administered either as the free base or as the non-toxic acid-addition or quaternary ammonium salts thereof. The compounds may be administered orally or parenterally, if desired, and when so administered are active anticonvulsants at individual doses ranging from about 25 to about 350 milligrams per kilogram of body weight. The dosage level can be adjusted to provide optimum therapeutic response. Thus, for example, several doses may be administered daily or the dosage may be reduced proportionately as indicated by the exigencies of the therapeutic situation.

For therapeutic administration, the active compounds of this invention may be incorporated with excipients and used, for example, in the form of tablets, troches, capsules, elixirs, suspension, syrups, wafers, chewing gum and the like. Such compounds and preparations should contain at least 0.1% of active compound. The percentage in the compositions and preparations may, of course, be varied and may conveniently be between about 5% to about 75% or more of the weight of the unit. The amount of active compound in such therapeutically useful compositions or preparations is such that a suitable dosage will be obtained. Preferred compositions or preparations according to the present invention are prepared so that a dosage unit form contains between about 10 and about 200 milligrams of active compound.

The tablets, troches, pills, capsules and the like may contain the following: a binder such as gum tragacanth, acacia, corn starch or gelatin; a disintegrating agent such as a corn starch, potato starch, alginic acid and the like; a lubricant such as magnesium stearate; and a sweetening agent such as sucrose or saccarin may be added or a flavoring agent such as peppermint, oil of wintergreen or cherry flavoring.

A syrup or elixir may contain the active compounds in the form of their non-toxic acid-addition salts, sucrose as a sweetening agent, methyl and propyl parabens as preservatives, a dye and a flavoring such as cherry or orange flavor.

The invention will be described in greater detail in conjunction with the following specific examples.

EXAMPLE 1

*2-methyl-4H-pyrido[4,3-d][1,3]-oxazin-4-one*

A mixture of 3.4 g. of 4-acetamidonicotinic acid (or 4-aminoicotinic acid) and 20 ml. of acetic anhydride is heated at reflux for 2.5 hours during which time 16 ml. of solvent is distilled. The mixture is evaporated under reduced presure, diluted with ethyl acetate, filtered and the filtrate caused to crystallize by the addition of n-heptane. The yellow crystalline product is unstable and is used without delay for the next reaction.

EXAMPLE 2

*4-acetamido-3-benzoylpyridine*

To a suspension of 2.2 g. of 2-methyl-4H-pyrido[4,3-d][1,3]-oxazin-4-one in 30 ml. of dry benzene and 15 ml. of ether at 0° C. is added 5.0 ml. of phenylmagnesium bromide (3 M in ether) dropwise over 1.5 hours. The mixture is allowed to rise to room temperature and stirred overnight. Upon cooling to 0° C. again, 15 ml. of 2 N hydrochloric acid is added dropwise with stirring. The mixture is diluted with ethyl acetate, neutralized with saturated sodium bicarbonate and the organic layer is washed with 2 N sodium hydroxide and with saturated saline. Upon evaporation, a yellow oil is obtained which is chromatographed on 250 g. of silica gel. Elution with ether-dichloromethane (2:3) gives crystals which upon crystallization from ether-hexane, gives pure 4-acetamido-3-benzoylpyridine.

EXAMPLE 3

*4-amino-3-benzoylpyridine*

A solution of 400 mg. of 4-acetamido-3-benzoylpyridine in 10 ml. of ethanol and 10 ml. of 6 N hydrochloric acid is heated at reflux for 2 hours, cooled, diluted with water and neutralized with ammonium hydroxide. The resulting solid, collected by filtration, is crystallized from chloroform-hexane to give 4-amino-3-benzoylpyridine as white needles.

EXAMPLE 4

*4-(α-carbobenzoxamidoacetamido)-3-benzoylpyridine*

A solution of 460 mg. of cyclohexylcarbodiimide in 1 ml. of dichloromethane is added to a solution of 396 mg. of 4-amino-3-benzoylpyridine and 460 mg. of carbobenzyloxyglycine in 3 ml. of tetrahydrofuran and the mixture is stirred at room temperature for 5 hours. The dicyclohexylurea (450 mg.) which precipitates almost immediately is filtered and the filtrate is evaporated to an oil which is chromatographed on silica gel with dichloromethane. Elution with ether:dichloromethane (1:4) gives 625 mg. of 4-(carbobenzoxamidoacetamido)-3-benzoylpyridine.

EXAMPLE 5

*1,3-dihydro-5-phenyl-2H-pyrido[4,3-e]-1,4-diazepin-2-one*

To a flask containing 525 mg. of 4-(α-carbobenzoxamidoacetamido)-3-benzoylpyridine is added 6 ml. of a saturated solution of hydrogen bromide in acetic acid. The mixture is warmed to 50° C. to effect solution, then stirred at room temperature for 1 hour, and concentrated under reduced pressure. Addition of ether gives a pasty solid which is filtered, dissolved in 10 ml. of 75% aqueous methanol and neutralized with ammonium hydroxide. The solvents are evaporated and the residue is heated at reflux for 3 hours in toluene. Upon evaporation of the solvent 300 mg. of a green oil is obtained which is chromatographed on 20 g. of silica gel with dichloromethane. Elution with ether gives pyridodiazepinone and crystallization from chloroform-heptane gives an analytical specimen.

EXAMPLE 6

*2-methyl-4H-pyrido[2,3-d][1,3]oxazin-4-one*

A mixture of 5.0 g. of 2-aminonicotinic acid and 20 ml. of acetic anhydride is heated at reflux in an inert atmosphere for 2 hours, during which time 16 ml. of solvent is distilled. Crystallization occurs upon cooling and the brown crystalline product is collected by filtration. Crystallization from ethyl acetate-heptane gives pale yellow needles. A sample with a constant melting point is obtained by alternate crystallization from benzene and from ethyl acetate-heptane. This product appears to be unstable and is used as soon as practical for the next step.

EXAMPLE 7

*2-acetamido-3-benzoylpyridine*

To a suspension of 4.4 g. of 2-methyl-4H-pyrido[2,3-d][1,3]-oxazin-4-one in 75 ml. of dry benzene and 50 ml.

of ether at 0° is added 10.0 ml. of phenylmagnesium bromide (3 M in ether) dropwise over 1.5 hours. The mixture is stirred at room temperature for 2 hours, cooled to 0° C., and to it is slowly added 30 ml. of 2 N hydrochloric acid. The mixture is then neutralized with saturated sodium bicarbonate, the products extracted into ethyl acetate and the extract washed with saturated saline and evaporated. The crude residue, an intractable oil, is chromatographed on 400 g. of silica gel. Elution with ether-dichloromethane (1:1) gives 1.75 g. of 2-acetamido-3-benzoylpyridine. The product is crystallized from ether with no alteration of melting point.

EXAMPLE 8

2-amino-3-benzoylpyridine

A solution of 1.6 g. of 2-acetamido-3-benzoylpyridine in 50 ml. of ethanol and 50 ml. of 6 N hydrochloric acid is heated at reflux for 3 hours during which time 35 ml. of solvent is distilled. Upon cooling and neutralization with ammonium hydroxide, 2-amino-3-benzoylpyridine is collected by filtration. Crystallization gives an analytical specimen as pale yellow plates.

EXAMPLE 9

1,3-dihydro-5-phenyl-2H-pyrido[2,3-e]-1,4-diazepin-2-one

To a solution of 400 mg. of 2-amino-3-benzoylpyridine and 460 mg. of carbobenzyloxyglycine in 5 ml. of tetrahydrofuran and 2 ml. of dichloromethane is added 460 mg. of dicyclohexylcarbodiimide in 2 ml. of dichloromethane. The mixture is stirred at 0° C. for 3 hours and at room temperature for 10 hours after which an additional 300 mg. each of carbobenzyloxyglycine and cyclohexylcarbodiimide is added and the mixture again stirred overnight. After filtration of the dicyclohexylurea, the filtrate is evaporated under reduced pressure, dissolved in ethyl acetate, washed with saturated saline, evaporated and chromatographed on 40 g. of silica gel. Elution with ether-dichloromethane (1:1) gives 2-($\alpha$-carbobenzoxamidoacetamido)-3-benzoyl pyridine as an oil. The above oil is dissolved in 3 ml. of acetic acid saturated with hydrogen bromide and allowed to stand at room temperature for 1 hour. Upon the addition of ether a white powder is precipitated which is collected by filtration and immediately dissolved in 6 ml. of 80% aqueous methanol and neutralized with ammonium hydroxide. The solvents are evaporated and heated at reflux with pyridine for 3 hours. Upon evaporation of the solvent, the residue is dissolved in ethyl acetate and water and the organic layer is dried and evaporated to white needles of 1,3-dihydro-5-phenyl-2H-pyrido[2,3-e]-1,4-diazepin-2-one. Crystallization from chloroform-heptane does not alter the melting point.

EXAMPLE 10

2-methyl-4H-pyrido[3,4-d][1,3]-oxazin-4-one

A mixture of 6.5 g. of 3-aminoisonicotinic acid and 25 ml. of acetic anhydride is heated at reflux for 3 hours during which time 20 ml. of solvent is distilled. Upon cooling, ether is added and 4.8 g. of product, in the form of tan granules, is collected by filtration. The product is used without delay for the next reaction.

EXAMPLE 11

3-acetamido-4-benzoylpyridine

To a solution of 4.7 g. of 2-methyl-4H-pyrido[3,4-d][1,3]-oxazin-4-one in 60 ml. of dry benzene and 25 ml. of ether at 0° C. is added 10 ml. of phenylmagnesium bromide (3 M in ether) dropwise over 2 hours. The mixture is allowed to rise to room temperature and is stirred overnight. Upon cooling again, 20 ml. of 2 N hydrochloric acid is added dropwise with stirring. The mixture is diluted with ethyl acetate, neutralized with saturated sodium bicarbonate and the organic layer is washed with 2 N sodium hydroxide and saturated saline. Upon evaporation, an amber oil is obtained which is chromatographed on 250 g. of silica gel. Elution with acetone-ether (1:20) gives 2.7 g. of white crystals. Pure 3-acetamido-4-benzoylpyridine is obtained by crystallization from toluene.

EXAMPLE 12

3-amino-4-benzoylpyridine

A solution of 2.3 g. of 3-acetamido-4-benzoylpyridine in 30 ml. of ethanol and 30 ml. of 6 N hydrochloric acid is heated at reflux for 3 hours during which time 20 ml. of solvent is distilled. The mixture is cooled, neutralized with ammonium hydroxide and filtered to give 1.9 g. of 3-amino-4-benzoylpyridine as yellow needles. Crystallization from chloroform-n-heptane and from ether-n-hexane does not alter the melting range.

EXAMPLE 13

1,3-dihydro-5-phenyl-2H-pyrido[3,4-e]-1,4-diazepin-2-one

A solution of 460 mg. of dicyclohexylcarbodiimide in 3 ml. of dichloromethane is added to a solution of 400 mg. of 3-amino-4-benzoylpyridine and 460 mg. of carbobenzyloxyglycine in 5 ml. of tetrahydrofuran, and the mixture is stirred at room temperature for 2 hours. The dicyclohexylurea which precipitates is filtered and the filtrate is evaporated, dissolved in benzene, washed with saturated sodium bicarbonate solution and saturated saline, dried and evaporated to 775 mg. of a yellow oil.

The oily 3-($\alpha$-carbobenzoxamidoacetamido)-4-benzoylpyridine is stirred at room temperature for 1 hour in 4 ml. of a saturated solution of hydrogen bromide in acetic acid. Addition of ether gives a hygroscopic solid which is immediately dissolved in 10 ml. of 80% aqueous methanol and neutralized with ammonium hydroxide. The solvents are then evaporated to an oil which is dissolved in chloroform, washed with water and evaporated. The oily residue is dissolved in 60 ml. of toluene containing 1 ml. of pyridine and the mixture is heated at reflux overnight. After distillation of a portion of the solvent, a small amount of n-hexane is added, the mixture is cooled and 300 mg. of 1,3-dihydro-5-phenyl-2H-pyrido[3,4-e]-1,4-diazepin-2-one is collected by filtration. Further crystallizations from methanol-benzene does not alter the melting range.

EXAMPLE 14

2-methyl-4H-pyrido[3,2-d][1,3]oxazin-4-one

A solution of 1.0 g. of 3-aminopicolinic acid in 5 ml. of acetic anhydride is heated at reflux for 2.5 hours during which time 3 ml. of solvent is distilled. The solution is then concentrated to a small volume, diluted with ether and filtered to give 540 mg. of a brown amorphous solid. Crystallization from ethyl acetate-n-heptane gives 440 mg. of the oxazinone which is used without delay for the next reaction.

EXAMPLE 15

3-acetamido-2-benzoylpyridine

To a suspension 2.5 g. of 2-methyl-4H-pyrido[3,2-d][1,3]oxazin-4-one in 30 ml. of dry benzene and 20 ml. of ether at 0° C. is added 6.0 ml. of phenylmagnesium bromide (3 M in ether) dropwise over 1 hour. The mixture is allowed to rise to room temperature and is stirred overnight. Upon cooling again to 0° C., the mixture is neutralized with 2 N hydrochloric acid and extracted with ethyl acetate. After washing with saturated sodium bicarbonate solution and with saturated saline, the organic layer is dried and evaporated to an oil which crystallizes upon the addition of ether to give 700 mg. of a white powder. Crystallization from chloroform-n-heptane followed by sublimation gives pure 3-acetamido-$\alpha,\alpha$-diphenyl-2-pyridinemethanol. The mother liquor from the above crude material is evaporated and chromatographed on 200 g. of silica gel. Ether-dichloro-methane (1:9) gives 1.05 g. of 3-acetamido-2-benzoylpyridine which is used without further purification for the next reaction.

EXAMPLE 16

3-amino-2-benzoylpyridine

A solution of 1.0 g. of 3-acetamido-2-benzoylpyridine in 15 ml. of ethanol and 15 ml. of 6 N hydrochloric acid is heated at reflux for 3 hours, cooled, and neutralized with ammonium hydroxide. The product, an olive green pulverulent solid weighing 663 mg. is crystallized from ether-n-hexane to give yellow needles. A sample for analysis may be prepared by sublimation.

EXAMPLE 17

1,3-dihydro-5-phenyl-2H-pyrido[3,2-e]-1,4-diazepin-2-one

A solution of 560 ml. of dicyclohexylcarbodiimide in 6 ml. of dichloromethane is added to a solution of 480 mg. of 3-amino-2-benzoylpyridine and 560 mg. of carbobenzyloxyglycine in 6 ml. of tetrahydrofuran and the mixture is stirred at room temperature for 18 hours. The dicyclohexylurea which precipitates is filtered and the filtrate is evaporated, dissolved in benzene and washed with saturated sodium bicarbonate solution and saturated saline, dried and evaporated. The resulting oil, 3-(α-carbobenzoxamido - acetamido) - 2 - benzoylpyridine is stirred at room temperature for 2 hours in 6 ml. of a saturated solution of hydrogen bromide in acetic acid. Addition of ether gives a pasty white mass which is filtered and immediately dissolved in 10 ml. of 80% aqueous methanol. After neutralization with ammonium hydroxide the solution is concentrated to a small volume which is extracted with chloroform and the organic layer is dried and evaporated to a tan oil. The oil is dissolved in 50 ml. of toluene containing 1 ml. of pyridine and the solution is heated at reflux overnight during which time 40 ml. of solvent is distilled. Upon cooling, n-heptane is added and 330 mg. of 1,3-dihydro-5-phenyl-2H-pyrido [3,2-e]-1,4-diazepin-2-one is collected by filtration. Purification of the product is achieved by crystallization from methanol-toluene or by sublimation.

EXAMPLE 18

3-amino-4-benzoylpyridine oxime

A solution of 550 mg. of 3-amino-4-benzoylpyridine and 460 mg. of hydroxylamine hydrochloride in 15 ml. of ethanol is heated at reflux for 18 hours during which time 10 ml. of solvent is distilled. Upon cooling, 1 ml. of benzene is added and the mixture is neutralized with dilute potassium carbonate solution. Filtration gives 480 mg. of oxime as white needles.

EXAMPLE 19

2-methylamino-5-phenyl-3H-pyrido[3,4-e]-1,4-diazepine-4-oxide

To a solution of 460 mg. of 3-amino-4-benzoylpyridine oxime in 4 ml. of acetic acid is added 300 mg. of chloroacetyl chloride and the mixture is allowed to stand at room temperature for 72 hours. After saturation with hydrogen chloride the solution is evaporated. The residue is dissolved in dichloromethane, washed with dilute potassium carbonate solution, dried and evaporated to 330 mg. of an oil. The crude chloromethylpyridopyrimidine is dissolved in 5 ml. of a 30% solution of methylamine in methanol and the solution is allowed to stand at room temperature for 18 hours. After concentration, the residue is acidified with cold dilute hydrochloric acid, then washed with ether. The aqueous layer is separated, neutralized and extracted with dichloromethane. The organic layer is dried and evaporated to give 2-methylamino-5-phenyl-3H-pyrido[3,4-e]-1,4-diazepine-4-oxide.

EXAMPLE 20

1,3-dihydro-5-phenyl-2H-pyrido[3,4-e]-1,4-diazepin-2-one-4-oxide

A solution of 130 mg. of 2-methylamino-5-phenyl-3H-pyrido[3,4-e]-1,4-diazepine-4-oxide, 2 ml. of 2 N hydrochloric acid and 5 ml. of dioxane is allowed to stand at room temperature overnight. The solution is made alkaline with 1 N sodium hydroxide solution, diluted with water and washed with ether. The aqueous layer is neutralized with dilute acetic acid and thoroughly extracted with chloroform. Evaporation of the chloroform solution and recrystallization of the residue from benzene-ethanol affords 57 mg. of 1,3-dihydro-5-phenyl-2H-pyrido-[3,4-e]-1,4-diazepin-2-one-4-oxide.

EXAMPLE 21

2-methylamino-5-phenyl-3H-pyrido[3,4-e]-1,4-diazepine

A solution of 165 mg. of 2-methylamino-5-phenyl-3H-pyrido[3,4-e]-1,4-diazepine 4-oxide in 10 ml. of dioxane is hydrogenated at room temperature and atmospheric pressure in the presence of 500 mg. of Raney nickel. After the uptake of hydrogen slows markedly, the catalyst is removed by filtration of the warm solution. The filtrate is concentrated to a small volume by evaporation under reduced pressure. The product, which separates on the addition of n-hexane-benzene to the residue, amounts to 138 mg.

EXAMPLE 22

2-methylamino-5-(3-trifluoromethylphenyl)-3H-pyrido-[4,3-e]-1,4-diazepine 4-oxide A mixture of 500 mg. of 4-amino-3-(3-trifluoromethylbenzoyl)-pyridine, 300 mg. of chloroacetyl chloride and 4 ml. of acetic acid is allowed to stand at room temperature for 72 hours. The mixture is saturated with hydrogen chloride and the solution is evaporated. The residue is dissolved in chloroform, washed with dilute potassium carbonate solution and evaporated to give 340 mg. of a brown oil. The oil is dissolved in 5 ml. of a 30% solution of methylamine in methanol and the solution is allowed to stand at room temperature for 18 hours. The solution is concentrated and the residue is dissolved in cold dilute hydrochloric acid. The aqueous solution is washed with ether, neutralized and extracted with chloroform. The chloroform solution is dried over sodium sulfate and evaporated to give 2-methylamino-5-(3-trifluoromethylphenyl)-3H-pyrido[4,3-e]-1,4-diazepine-4-oxide as a crystalline solid.

EXAMPLE 23

1,3-dihydro-1-methyl-5-phenyl-2H-pyrido[4,3-e]-1,4-diazepin-2-one

From a mixture of 148 mg. of 1,3-dihydro-5-phenyl-2H-pyrido[4,3-e]-1,4-diazepin-2-one and 30 mg. of sodium methoxide in 25 ml. of dry toluene is distilled 10 ml. of solvent. After cooling to room temperature, 0.050 ml. of dimethyl sulfate is added and the mixture is heated at 60° C. for 1 hour. The residue obtained on evaporation of the solvent under reduced pressure is crystallized from methanol-petroleum ether to give 65 mg. of 1,3-dihydro-1-methyl-5-phenyl-2H-pyrido[4,3-e]-1,4-diazepin-2-one.

EXAMPLE 24

1,3-dihydro-5-(3-trifluoromethylphenyl)-2H-pyrido-[4,3-e]-1,4-diazepin-2-one To a solution of 205 mg. of 3-amino-4-(3-trifluoromethylbenzoyl)-pyridine and 230 mg. of carbobenzyloxyglycine in 4 ml. of tetrahydrofuran is added a solution of 230 mg. of dicyclohexylcarbodiimide in 3 ml. of dichloromethane. After stirring for 2 hours at room temperature the mixture is filtered and the filtrate is evaporated. The residue is dissolved in benzene, washed with saturated sodium bicarbonate solution and concentrated to give 380 mg. of 3-(α-carbobenzoxamidoacetamido)-4-(3-trifluoromethylbenzoyl)-pyridine as an oil. The oil is treated for 1 hour with 2 ml. of a saturated solution of hydrogen bromide in acetic acid. Addition of ether affords a solid which is dissolved in 5 ml. of 80% aqueous methanol and neutralized with dilute ammonium hydroxide. The residue is dissolved in 25 ml. of toluene containing 0.5 ml. of pyridine and the mixture is heated at reflux for 12 hours. After distillation of a portion of the solvent a small portion of n-hexane is added. The mixture is cooled and 110 mg. of product is collected by filtration.

EXAMPLE 25

*2,3-dihydro-7-methyl-2-oxo-5-phenyl-1H-pyrido[4,3-e]-1,4-diazepin-7-ium iodide*

A solution of 140 mg. of 1,3-dihydro-5-phenyl-2H-pyrido[3,4-e]-1,4-diazepin-2-one and 1.0 ml. of methyl iodide in 10 ml. of toluene is heated at reflux for 12 hours. The mixture is cooled to room temperature and the quaternary salt is collected by filtration.

EXAMPLE 26

*2,3-dihydro-1,7-dimethyl-2-oxo-5-phenyl-1H-pyrido-[4,3-e]-1,4-diazepin-7-ium iodide*

A solution of 100 mg. of 1,3-dihydro-1-methyl-5-phenyl-2H-pyrido[4,3-e]-1,4-diazepin-2-one and 1.0 ml. of methyl iodide in 10 ml. of toluene is heated at reflux overnight. The mixture is cooled to room temperature and diluted with n-heptane to give 86 mg. of 2,3-dihydro-1,7-dimethyl-2-oxo - 5 - phenyl - 1H - pyrido[4,3-e]-1,4-diazepin-7-ium iodide.

What is claimed is:

1. A compound selected from the group consisting of compounds of the formula:

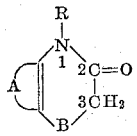

wherein R is selected from the group consisting of hydrogen and lower alkyl, A represents a nitrogen atom and the three carbon atoms which completes the 6-membered pyridine ring and which is selected from the group consisting of

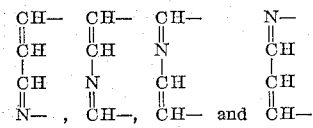

and B represents a carbon-nitrogen linkage which completes the 7-membered diazepin ring and which is selected from the group consisting of

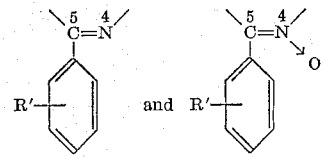

wherein R' is selected from the group consisting of hydrogen, halogen, lower alkyl, lower alkoxy, nitro, amino and trifluoromethyl; and the pharmaceutically acceptable non-toxic acid-addition and lower alkyl quaternary ammonium salts thereof.

2. 1,3 - dihydro - 5 - phenyl - 2H-pyrido[4,3-e] - 1,4-diazepin-2-one.

3. 1,3 - dihydro - 5 - phenyl - 2H-pyrido[3,2-e]-1,4-diazepin-2-one.

4. 1,3 - dihydro - 5 - phenyl - 2H-pyrido[2,3-e] - 1,4-diazepin-2-one.

5. 1,3 - dihydro - 5 - phenyl - 2H-pyrido[3,4-3] - 1,4-diazepin-2-one.

6. 1,3 - dihydro - 1 - methyl - 5 - phenyl - 2H-pyrido-[4,3-e]-1,4-diazepin-2-one.

7. 1,3 - dihydro - 5 - (3-trifluoromethylphenyl)-2H-pyrido[4,3-e]-1,4-diazepin-2-one.

8. 1,3 - dihydro - 5 - phenyl - 2H-pyrido[3,4-e]-1,4-diazepin-2-one-4-oxide.

9. 2,3 - dihydro - 7 - methyl - 2 - oxo-5-phenyl-1H-pyrido-[4,3-e]-1,4-diazepin-7-ium iodide.

10. 2,3 - dihydro - 1,7-dimethyl - 2 - oxo-5-phenyl-1H-pyrido[4,3-e]-1,4-diazepin-7-ium iodide.

11. A compound selected from the group consisting of compounds of the formula:

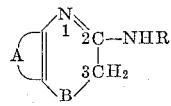

wherein R is selected from the group consisting of hydrogen and lower alkyl, A represents a nitrogen atom and the three carbon atoms which completes the 6-membered pyridine ring and which is selected from the group consisting of

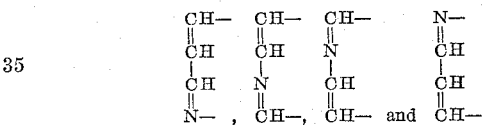

and B represents a carbon-nitrogen linkage which completes the 7-membered diazepin ring and which is selected from the group consisting of

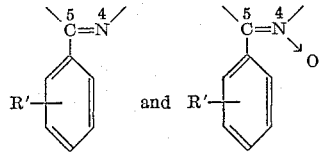

wherein R' is selected from the group consisting of hydrogen, halogen, lower alkyl, lower alkoxy, nitro, amino and trifluoromethyl; and the pharmaceutically acceptable non-toxic acid-addition and lower alkyl quaternary ammonium salts thereof.

12. 2 - methylamino - 5 - phenyl - 3H-pyrido[3,4-3]-1,4-diazepine 4-oxide.

13. 2 - amino - 5 - phenyl - 3H-pyrido[4,3-e]-1,4-diazepine.

14. 2 - methylamino - 5 - phenyl - 3H-pyrido[3,4-e]-1,4-diazepine.

15. 2 - methylamino - 5 - (3-trifluoromethylphenyl)-3H-pyrido[4,3-e]-1,4-diazepine 4-oxide.

No references cited.

WALTER A. MODANCE, *Primary Examiner.*

ROBERT T. BOND, *Assistant Examiner.*